US010136374B2

(12) United States Patent
Roeland et al.

(10) Patent No.: US 10,136,374 B2
(45) Date of Patent: Nov. 20, 2018

(54) METHODS, NETWORK NODES AND USER EQUIPMENTS FOR CONTROLLING IP FLOW MOBILITY IN A COMMUNICATION NETWORK

(71) Applicant: Telefonaktiebolaget L M Ericsson (publ), Stockholm (SE)

(72) Inventors: Dinand Roeland, Sollentuna (SE); Jari Vikberg, Järna (SE); Tomas Hedberg, Stockholm (SE); Stefan Rommer, Västra Frölunda (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 146 days.

(21) Appl. No.: 14/423,492

(22) PCT Filed: Dec. 18, 2014

(86) PCT No.: PCT/SE2014/051525
§ 371 (c)(1),
(2) Date: Feb. 24, 2015

(87) PCT Pub. No.: WO2016/072900
PCT Pub. Date: May 12, 2016

(65) Prior Publication Data
US 2016/0219480 A1 Jul. 28, 2016

Related U.S. Application Data

(60) Provisional application No. 62/076,679, filed on Nov. 7, 2014.

(51) Int. Cl.
*H04W 36/22* (2009.01)
*H04W 28/08* (2009.01)
(Continued)

(52) U.S. Cl.
CPC ....... *H04W 36/22* (2013.01); *H04W 28/0268* (2013.01); *H04W 28/08* (2013.01);
(Continued)

(58) Field of Classification Search
CPC . H04W 36/22; H04W 28/0268; H04W 28/10; H04W 28/08; H04W 36/0027
See application file for complete search history.

(56) References Cited

U.S. PATENT DOCUMENTS

2013/0070596 A1* 3/2013 Yeh ............ H04W 36/0038
370/235
2015/0195743 A1* 7/2015 Sirotkin ............ H04W 28/08
370/235
(Continued)

OTHER PUBLICATIONS

Ericsson, "Description of RAN-based solution without ANDSF", 3GPP Draft, S2-142538 23482 RAN S0lution, 3rd Generation Partnership Project (3GPP), Mobile Competence Centre, Dublin, Ireland; Jul. 2014.*
(Continued)

*Primary Examiner* — Pao Sinkantarakorn
*Assistant Examiner* — Kabir U Jahangir
(74) *Attorney, Agent, or Firm* — Sage Patent Group

(57) ABSTRACT

A method for controlling IP flow mobility is performed in a communication network comprising 3GPP and non-3GPP access networks, wherein a UE has an IP flow mobility PDN connection set up towards the communication network. The method comprises triggering sending to the UE, a number of IP flow specific RAN assistance parameter values for controlling the UE to route an IP flow of the IP flow mobility PDN connection either over the 3GPP access network or the non-3GPP access network. The IP flow specific RAN assistance parameters may be threshold parameters setting a limit for when to route an IP flow to the 3GPP access network or when to route the IP flows to the non-3GPP access network.

20 Claims, 8 Drawing Sheets

(51) Int. Cl.
*H04W 36/00* (2009.01)
*H04W 28/02* (2009.01)
*H04W 28/12* (2009.01)
*H04W 40/02* (2009.01)

(52) U.S. Cl.
CPC ....... *H04W 28/12* (2013.01); *H04W 36/0027* (2013.01); *H04W 40/02* (2013.01)

(56) References Cited

U.S. PATENT DOCUMENTS

| | | | | |
|---|---|---|---|---|
| 2015/0195759 A1* | 7/2015 | Sirotkin | ................ | H04W 8/005 370/331 |
| 2015/0271729 A1* | 9/2015 | Sirotkin | ................ | H04W 48/00 370/332 |
| 2015/0304898 A1* | 10/2015 | Faccin | .............. | H04W 28/0289 370/235 |
| 2015/0327139 A1* | 11/2015 | Sirotkin | .............. | H04W 76/046 370/332 |
| 2016/0043937 A1* | 2/2016 | Phuyal | ................ | H04W 76/026 370/329 |
| 2016/0050604 A1* | 2/2016 | Lee | ..................... | H04W 76/046 370/331 |
| 2016/0073297 A1* | 3/2016 | Hwang | ............. | H04W 36/0011 370/331 |
| 2016/0165532 A1* | 6/2016 | Nagasaka | ............. | H04W 48/18 370/338 |

OTHER PUBLICATIONS

ZTE, Verizon, Oracle, Broadcom "IP flow mobility solutions for S2b (GTP)—UE-initiated and Network-initiated IP flow mobility", SA WG2 Meeting #104, S2-142449, Jul. 7-11, 2014, Dublin, Ireland, 15 pages.

Ericsson, "Network-initiated IFOM using S2a and GTP", SA WG2 Meeting #104, S2-142364, Jul. 7-11, 2014, Dublin, Ireland, 6 pages.

Catt, "Traffic steering of solutions without ANDSF", 3GPP TSG RAN WG2 Meeting #84, R2-133892, San Francisco, USA, Nov. 11-15, 2013, 3 pages.

Ericsson, "Traffic routing", 3GPP TSG-RAN WG2 #85, Tdoc R2-140456, Prague, Czech Republic, Feb. 10-14, 2014, 20 pages.

3GPP TS 23.401 V13.0.0 (Sep. 2014) "3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 13)", 650 Route des Lucioles, Sophia Antipolis, Valbonne, France; 308 pages.

3GPP TS 23.402 V12.6.0 (Sep. 2014) "3$^{rd}$ Generation Partnership Project; Technical Specification Group Services and System Aspects; Architecture enhancements for non-3GPP accesses (Release 12)", 650 Route des Lucioles, Sophia Antipolis, Valbonne, France; 288 pages.

3GPP TS 36.304 V12.0.0 (Mar. 2014) "3$^{rd}$ Generation Partnership Project; Technical Specification Group Radio Access Network; Evolved Universal Terrestrial Radio Access (E-UTRA); User Equipment (UE) procedures in idle mode (Release 12)", 650 Route des Lucioles, Sophia Antipolis, Valbonne, France; 34 pages.

3GPP TS 36.331 V12.1.0 (Mar. 2014) "3$^{rd}$ Generation Partnership Project; Technical Specification Group Radio Access Network; Evolved Universal Terrestrial Radio Access (E-UTRA); Radio Resource Control (RRC); Protocol specification (Release 12)", 650 Route des Lucioles, Sophia Antipolis, Valbonne, France; 356 pages.

* cited by examiner

METHODS, NETWORK NODES AND USER EQUIPMENTS FOR CONTROLLING IP FLOW MOBILITY IN A COMMUNICATION NETWORK

CROSS REFERENCE TO RELATED APPLICATION

This application is a 35 U.S.C. § 371 national stage application of PCT International Application No. PCT/SE2014/051525, filed in the English language on 18 Dec. 2014, which claims priority to U.S. Provisional Application No. 62/076,679 filed 7 Nov. 2014, the disclosures and content of which are incorporated by reference herein in their entirety.

TECHNICAL FIELD

The present disclosure relates generally to methods, user equipments and network nodes for controlling IP flow mobility in a communication network comprising a 3GPP access network and a non-3GPP access network, wherein a UE has an IP flow mobility packet data network, PDN, connection set up towards the communication network.

BACKGROUND

FIG. 1 is an overview of an evolved packet system, EPS, architecture 100 comprising evolved packet core, EPC, and a number of radio access networks connected to the EPC, as defined in specification 3$^{rd}$ Generation Partnership Program, 3GPP, TS 23.401. To this core network, different 3GPP defined access networks may be connected, such as an Evolved Universal Mobile Telecommunication System, UMTS, Terrestrial Radio Access Network, E-UTRAN 150, a UTRAN 160 and a GSM Edge Radio Access Network, GERAN 170. The radio access networks GERAN, UTRAN and E-UTRAN each comprises a number of base stations: base transceiver stations, BTS, nodeBs and eNodeBs, respectively (not shown) to which a user equipment, UE 120 may be connected. In addition, GERAN and UTRAN comprise also radio access network controllers: base station controllers, BSC, and radio network controllers, RNC, respectively (not shown). The UE 120 may be any kind of device that is enabled to be wirelessly connected via a 3GPP access network such as the E-UTRAN 150, the UTRAN 160 or the GERAN 170, such as a mobile phone, laptop etc. The EPC comprises a Mobility Management Entity, MME 102 connected to the E-UTRAN, a Serving Gateway, SGW 104 connected to the E-UTRAN, the MME and the UTRAN. The EPC further comprises a Packet Data Network, PDN, gateway, PGW 110 connected to the SGW, and a Policy Charging and Rules Function, PCRF 108, which functions as a policy controller, connected to the PGW. Further, to the PGW 110 and the PCRF 108 a packet data network 112 may be connected over which one or more operators' IP services may be provided to UEs via the EPC and the 3GPP access networks.

FIG. 2 shows an extension to the EPS architecture in order to allow also non-3GPP accesses. The extension is specified in 3GPP TS 23.402. In a non-3GPP network the radio interface is not specified by the 3GPP. An example of a non-3GPP network is WLAN. In the figure, some functionality belongs to the 3GPP network whereas some belong to the non-3GPP network. In FIG. 2, the 3GPP network may be a Home Public Land Mobile Network, HPLMN for the UE 120. The HPLMN may identify the PLMN, Public Land Mobile Network, in which the profile (also known as the subscription) of the subscriber owning the UE is held.

A non-3GPP access network may be trusted or untrusted. The exact definition of trusted or untrusted is given in the 3GPP specifications. Simplified, one can say that a trusted access network 180 is managed by an operator, e.g. an operator hotspot that is also managing the HPLMN or an operator that in some way co-operates with the HPLMN operator, whereas an untrusted access network 190 is not managed by the operator, e.g. a WiFi access point at home. For the non-3GPP access network, a security gateway called evolved Packet Data Gateway, ePDG 130 is used between the untrusted access network 190 and the 3GPP network. The UE 120 is arranged to set up a secure tunnel to the ePDG, and between the ePDG 130 and the PGW 110 there is an S2b interface. A trusted 3GPP access network 180 hosts a gateway, e.g. a Trusted Wireless Access Gateway, TWAG 185, defined in 3GPP TS 23.402 section 16. There is a point-to-point interface between the UE and the TWAG, and between the TWAG 185 and the PGW 110 there is an S2a interface.

3GPP defines the concept of a Packet Data Network, PDN. A PDN is in most cases an IP network, e.g. the Internet or an operator IP-based Multimedia Services, IMS, service network. A PDN has one or more names; each name is defined in a string called Access Point Name, APN. The PGW 110 is a gateway towards one or more PDNs. A UE may have one or more PDN connections. A PDN connection is a logical IP tunnel between the UE and the PGW, providing the UE access to a PDN. The setup of a PDN connection is initiated from the UE. Each PDN connection has a single IP address or prefix.

PDN connections can be setup over a 3GPP access or over a non-3GPP access. A UE may have one or more PDN connections over a 3GPP access, or one or more PDN connections over a non-3GPP access, or both simultaneously. Every PDN connection comprises one or more bearers. A bearer uniquely identifies traffic flows that receive a common QoS treatment between a UE and the PGW. Each bearer on a particular access has a unique bearer ID. The bearer IDs assigned for a specific UE on S2a/S2b are independent of the bearer IDs assigned for the same UE on S5 and may overlap in value. S5 is the 3GPP-interface between the PDN gateway 110 and the Serving gateway 104.

On the 3GPP access, the bearer is end-to-end between the UE and the PGW 110. The bearer ID is known by the PGW, the MME 102, the eNodeB and the UE 120. On the non-3GPP access, there is no bearer concept between the UE and the TWAG/ePDG. The bearer concept is only defined between the PGW and the TWAG/ePDG; i.e. it is only defined over S2a/S2b. In this case, the bearer ID is known by the PGW and the TWAG/ePDG but not by the UE. Regardless of access type, the PCRF 108 is not aware of bearer IDs. Every PDN connection has at least one bearer and this bearer is called the default bearer. All additional bearers on the PDN connection are called dedicated bearers.

A bearer carries traffic in the form of IP packets. Which traffic is carried on a bearer is defined by filters. A filter is an n-tuple where each element in the tuple contains a value, a range, or a wildcard. An n-tuple is also known as an IP flow. An example of a 5-tuple is: [dst IP=83.50.20.110, src IP=145.45.68.201, dst port=80, src port=*, prot=TCP]. This 5-tuple defines a source and destination IP address, a source and destination port, and a protocol. The source port is a wildcard. Traffic matching this 5-tuple filter would be all TCP traffic from IP address 145.45.68.201 to IP address 83.50.20.110 and destination port 80. A traffic flow template, TFT, contains one or more filters. Every bearer has a TFT. One bearer within a PDN connection and access may lack an explicit TFT, this bearer is typically the default bearer. Implicitly, such a bearer has a TFT with a single filter matching all packets.

IFOM is defined in 3GPP TS 23.402 and stands for IP flow mobility. An IFOM PDN connection is a special PDN connection that still has a single IP address/prefix but is routed over multiple accesses simultaneously. The UE and the PGW negotiate which IP flow that gets routed over which access. Even though an IFOM PDN connection may be routed over multiple accesses simultaneously, the bearers on each access within that PDN connection are independent of each other. In order to negotiate which IP flow shall be routed over which access, routing rule update procedures are being defined. A routing rule update can be initiated either from the UE or from the PGW. Exemplary call flows for network-initiated routing rule update procedures for S2a can be found in "Network-initiated IFOM using S2a and GTP", SA WG2 Meeting #104, S2-142364, July 7-11, 2014, Dublin, Ireland. Exemplary call flows for network-initiated and UE-initiated routing rule update procedure for S2a and S2b can be found in "IP flow mobility solutions for S2b (GTP)—UE-initiated and Network-initiated IP flow mobility", SA WG2 Meeting #104, S2-142449, July 7-11, 2014, Dublin, Ireland.

3GPP is currently working on specifying a feature/mechanism for WLAN/3GPP Radio interworking in 3GPP Release-12, which improves operator control with relation to how a UE performs access selection and traffic steering between 3GPP and WLANs belonging to the operator or its partners, it may even be so that the mechanism can be used for other, non-operator, WLANs as well, even though this is not the main target. It has been agreed that for this mechanism the RAN provides assistance parameters that controls how the UE performs the access selection. The RAN assistance parameters are composed of three main components, namely threshold values, Offloading Preference Indicator, OPI, and WLAN identifiers. The following thresholds have been defined for LTE in TS 36.304, similar thresholds are also defined for the Universal Mobile Telecommunications System, UMTS:

$\text{Thresh}_{ServingOffloadWLAN,\ LowP}$—This specifies the Reference Signal Received Power, RSRP, threshold, e.g. in dBm, used by the UE for traffic steering to from E-UTRAN to WLAN.

$\text{Thresh}_{ServingOffloadWLAN,\ HighP}$—This specifies the RSRP threshold e.g. in dBm used by the UE for traffic steering from WLAN to E-UTRAN.

$\text{Thresh}_{ServingOffloadWLAN,\ LowQ}$—This specifies the RSRQ threshold in dB used by the UE for traffic steering from E-UTRAN to WLAN.

$\text{Thresh}_{ServingOffloadWLAN,\ HighQ}$—This specifies the Reference Signal Received Quality, RSRQ, threshold, e.g. in dB, used by the UE for traffic steering from WLAN to E-UTRAN.

$\text{Thresh}_{ChUtilWLAN,\ Low}$—This specifies the WLAN channel utilization (BSS load) threshold used by the UE for traffic steering from E-UTRAN to WLAN.

$\text{Thresh}_{ChUtilWLAN,\ High}$—This specifies the WLAN channel utilization (BSS load) threshold used by the UE for traffic steering from WLAN to E-UTRAN.

$\text{Thresh}_{BackhRateDLWLAN,\ Low}$—This specifies the backhaul available downlink bandwidth threshold used by the UE for traffic steering from WLAN to E-UTRAN.

$\text{Thresh}_{BackhRateDLWLAN,\ High}$—This specifies the backhaul available downlink bandwidth threshold used by the UE for traffic steering from E-UTRAN to WLAN.

$\text{Thresh}_{BackhRateULWLAN,\ Low}$—This specifies the backhaul available uplink bandwidth threshold used by the UE for traffic steering from WLAN to E-UTRAN.

$\text{Thresh}_{BackhRateULWLAN,\ High}$—This specifies the backhaul available uplink bandwidth threshold used by the UE for traffic steering from E-UTRAN to WLAN.

$\text{Thresh}_{BeaconRSSIWLAN,\ Low}$—This specifies the Beacon Received Signal Strength Indicator, RSSI, threshold used by the UE for traffic steering from WLAN to E-UTRAN.

$\text{Thresh}_{BeaconRSSIWLAN,\ High}$—This specifies the Beacon RSSI threshold used by the UE for traffic steering from E-UTRAN to WLAN.

In addition a timer value is defined:

$\text{Tsteering}_{WLAN}$—This specifies the timer value $\text{Tsteering}_{WLAN}$ during which the rules should be fulfilled before starting traffic steering between E-UTRAN and WLAN.

The UE is also programmed with "RAN rules" that make use of these assistance parameters. There are "RAN rules" defined both for moving traffic from 3GPP access to WLAN access, and for moving traffic from WLAN access to 3GPP access. Examples of "RAN rules" are shown below:

Rule 1: The UE is to move traffic from E-UTRAN to WLAN if conditions 1 and 2 below are satisfied for a time interval $\text{Tsteering}_{WLAN}$:

1. In the E-UTRAN serving cell: RSRPmeas<$\text{Thresh}_{ServingOffloadWLAN,\ LowP}$; or RSRQmeas<$\text{Thresh}_{ServingOffloadWLAN,\ LowQ}$;

2. In the target WLAN: Channel Utilization WLAN<$\text{Thresh}_{ChUtilWLAN,\ Low}$; and BackhaulRateDIWLAN>$\text{Thresh}_{BackhRateDLWAN,\ High}$; and BackhaulRateUIWLAN>$\text{Thresh}_{BackhRateULWLAN,\ High}$; and BeaconRSSI>$\text{Thresh}_{BeaconRSSIWLAN,\ High}$;

Rule 2: The UE moves traffic from WLAN to E-UTRAN if the following conditions 3 and 4 are satisfied for a time interval TsteeringWLAN:

3. In the source WLAN: ChannelUtilizationWLAN>$\text{Thresh}_{ChUtilWLAN,\ High}$; or BackhaulRateDIWLAN<$\text{Thresh}_{BackhRateDLWLAN,\ Low}$; or BackhaulRateUIWLAN<$\text{Thresh}_{BackhRateULWLAN,\ Low}$; or BeaconRSSI<$\text{Thresh}_{BeaconRSSIWLAN,\ Low}$;

4. In the target E-UTRAN cell: RSRPmeas>$\text{Thresh}_{ServingOffloadWLAN,\ HighP}$: and RSRQmeas>$\text{Thresh}_{ServingOffloadWLAN,\ HighQ}$;

Similar "RAN rules" are defined for UMTS.

The thresholds values could be for example metrics such as 3GPP signal related metrics such as RSRP/RSRQ/RSCP/EcNo, WLAN signal related metrics such as RSSI, WLAN load/utilization, WLAN backhaul load/capacity, etc. RSCP stands for Received Signal Code Power. EcNo stands for Energy per chip over the Noise. One example of a RAN rule that uses the threshold value could be that the UE should move traffic to a WLAN if the RSRP is below the signaled RSRP threshold at the same time as the WLAN RSSI is above the signaled RSSI threshold. In a similar way RAN assistance parameters are used to control when the UE should steer traffic back from WLAN to 3GPP. The RAN rules/policies are specified in a 3GPP specification such as TS 36.304 v12.0.0 and/or TS 36.331 v12.1.0.

In addition to providing the RAN Assistance Parameters from the RAN to the UE, the network also informs the UE about what PDN Connections are offloadable to WLAN and what PDN Connections are not offloadable and should remain in 3GPP access. For example, an operator may desire that the PDN Connection for IP-based Multimedia Services, IMS, (Voice over LTE) remains in 3GPP access while the PDN Connection for general Internet access may be moved to WLAN access. This indication is hereafter referred to as an "offloadability" indication. In the solution specified by 3GPP in rel-12, this "offloadability" indication is provided to the UE via Non-Access Stratum, NAS, signaling from the MME or SGSN to the UE.

The RAN rules are applied by the UE in such a way that when the RAN rule for moving traffic to WLAN is fulfilled, the UE moves all PDN Connections marked as "offloadable" to WLAN while any non-offloadable PDN Connections stays on 3GPP access. When the RAN rule for moving traffic to 3GPP access is fulfilled, the UE moves the PDN Connections active on WLAN to 3GPP access. A limitation of the rel-12 solution is that only PDN Connection level mobility is supported, i.e. the UE can move the PDN Connection between WLAN and 3GPP access, controlled by the RAN rules. However, the RAN cannot control IP flow mobility as being worked on in the rel-13 IFOM work item.

With the above mechanism it is likely not wanted, or maybe not even feasible, that the UE considers any WLAN when deciding where to steer traffic. For example, it may not be feasible that the UE uses this mechanism to decide to steer traffic to a WLAN not belonging to the operator. Hence it has been proposed that the RAN should also indicate to the UE which WLANs the mechanism should be applied for by sending WLAN identifiers. The RAN may also provide additional parameters which are used in Access Network Discovery and Selection Function, ANDSF, policies. One proposed parameter is the OPI. One possibility for OPI is that it is compared to a threshold in the ANDSF policy to trigger different actions, another possibility is that OPI is used as a pointer to point, and select, different parts of the ANDSF policy which would then be used by the terminal, i.e. the UE.

The RAN assistance parameters, i.e. thresholds, WLAN identifiers, OPI provided by RAN, may be provided with dedicated signaling and/or broadcast signaling. Dedicated parameters can only be sent to the UE when having a valid RRC connection to the 3GPP RAN. A UE which has received dedicated parameters applies dedicated parameters; otherwise the UE applies the broadcast parameters. If no RRC connection is established between the UE and the RAN, the UE cannot receive dedicated parameters. In 3GPP, it has been agreed that ANDSF should be enhanced for release-12 to use the thresholds and OPI parameters that are communicated by the RAN to the UE. More information on the ANDSF enhancements to support OPI and thresholds can be found in TS 23.402. If enhanced and valid ANDSF policies are provided to the UE, the UE will use the ANDSF policies instead of the RAN rules/policies (i.e. ANDSF has precedence). More detailed description for when RAN rules/policies are used and when ANDSF policies are used can be found in TS 23.402.

When performing handover between 3GPP access and WLAN, the existing RAN level integration method only supports mobility on a per-APN, or rather per PDN Connection, basis. The RAN Assistance Parameters, and in particular the thresholds, apply to all offloadable traffic of a UE. If the RAN rules for moving traffic to WLAN are fulfilled, the UE moves all offloadable PDN Connections to WLAN. Similarly, when RAN rules for moving traffic to 3GPP are fulfilled, the UE moves all PDN Connections active on WLAN to 3GPP. If IP Flow Mobility (IFOM) e.g. for S2a/S2b is supported by the UE and the network, there is no possibility to utilize the RAN solution together with the more fine-grained mobility support provided by IFOM.

SUMMARY

It is an object of the invention to address at least some of the problems and issues outlined above. Another object of the present invention is to provide better utilization of traffic resources in a communication network comprising a 3GPP access network and a non-3GPP access network, when a UE has an IP flow mobility PDN connection to the communication network. Another object of the present invention is to provide better service to a user, which UE has an IP flow mobility PDN connection to a communication network comprising a 3GPP access network and a non-3GPP access network.

The above objects are achieved by one or more of the below defined methods, UEs, 3GPP network nodes and 3GPP core network nodes According to an aspect, a method is provided, performed by a 3GPP network node for controlling IP flow mobility performed in a communication network comprising a 3GPP access network and a non-3GPP access network, wherein a UE has an IP flow mobility PDN connection set up towards the communication network. The method comprises triggering sending to the UE, a number of IP flow specific RAN assistance parameter values for controlling the UE to route an IP flow of the IP flow mobility PDN connection either over the 3GPP access network or over the non-3GPP access network.

According to another aspect, a method is provided, performed by a 3GPP core network node for controlling IP flow mobility performed in a communication network comprising a 3GPP access network and a non-3GPP access network, wherein a UE has an IP flow mobility PDN connection set up towards the communication network. The method comprises triggering sending to the UE, an IP flow specific offloadable indication indicating whether an IP flow is allowed to be moved from the 3GPP network to the non-3GPP access network.

According to another aspect, a method is provided for controlling IP flow mobility in a communication network, performed by a UE having an IP flow mobility PDN connection set up towards the communication network, the communication network comprising a 3GPP access network and a non-3GPP access network. The method comprises receiving from a 3GPP network node, a number of IP flow specific RAN assistance parameter values for controlling the UE to route a first IP flow of the IP flow mobility PDN connection either over the 3GPP access network or the non-3GPP access network. The method further comprises selecting to send the first IP flow of the IP flow mobility PDN connection either over the 3GPP access network or the non-3GPP access network based on the IP flow specific RAN assistance parameter values and on a first IP flow characteristic value.

According to another aspect, a 3GPP network node is provided, operable in a communication network for controlling IP flow mobility in the communication network. The communication network comprises a 3GPP access network and a non-3GPP access network, wherein a UE has an IP flow mobility PDN connection set up towards the communication network. The 3GPP network node comprises a processor and a memory. The memory contains instructions executable by said processor, whereby the 3GPP network node is operative for triggering sending to the UE, a number of IP flow specific radio access network, RAN, assistance parameter values for controlling the UE to route an IP flow of the IP flow mobility PDN connection either over the 3GPP access network or over the non-3GPP access network.

According to another aspect, a 3GPP core network node is provided, operable in a communication network for controlling IP flow mobility in the communication network. The communication network comprises a 3GPP access network and a non-3GPP access network, wherein a UE has an IP flow mobility PDN connection set up towards the communication network. The 3GPP core network node comprises a processor and a memory. The memory contains instructions executable by said processor, whereby the 3GPP core network node is operative for triggering sending to the UE, an IP flow specific offloadable indication indicating whether an IP flow is allowed to be moved from the 3GPP network to the non-3GPP access network.

According to another aspect, a UE is provided, operable in a communication network for controlling IP flow mobility in the communication network. The communication network comprises a 3GPP access network and a non-3GPP access network. The UE has an IP flow mobility PDN connection set up towards the communication network. The UE comprises a processor and a memory. The memory contains instructions executable by said processor, whereby the UE is operative for receiving, from a 3GPP network node, a number of IP flow specific RAN assistance parameter values for controlling the UE to route a first IP flow of the IP flow mobility PDN connection either over the 3GPP access network or the non-3GPP access network. The memory further contains instructions executable by said processor, whereby the UE is operative for selecting to send the first IP flow of the IP flow mobility PDN connection either over the 3GPP access network or the non-3GPP access network based on the IP flow specific RAN assistance parameter values and on a first IP flow characteristic value.

According to other aspects, computer programs and carriers are also provided, the details of which will be described in the claims and the detailed description.

BRIEF DESCRIPTION OF DRAWINGS

The solution will now be described in more detail by means of exemplary embodiments and with reference to the accompanying drawings, in which.

DETAILED DESCRIPTION

Shortly, a solution is provided to achieve better utilization of traffic resources in a communication network comprising a 3GPP access network and a non-3GPP access network, when a UE has an IP flow mobility PDN connection to the communication network. This is achieved by a 3GPP network node sending a number of IP flow specific RAN assistance parameter values to a UE for controlling the UE to route an IP flow of the IP flow mobility PDN connection either over the 3GPP access network or over the non-3GPP access network. The IP flow specific RAN assistance parameters may be threshold parameters setting a limit for when to route an IP flow to the 3GPP access network (e.g. LTE) or when to route the IP flows to the non-3GPP access network (e.g. WLAN). That the parameters are IP flow specific means that they are set per IP flow, in other words it is possible to make them differ from one IP flow to another. By sending IP flow specific RAN assistance parameter values to the UE, the UE can route different IP flows of the same IP flow mobility connection over different access networks.

Figure 1:
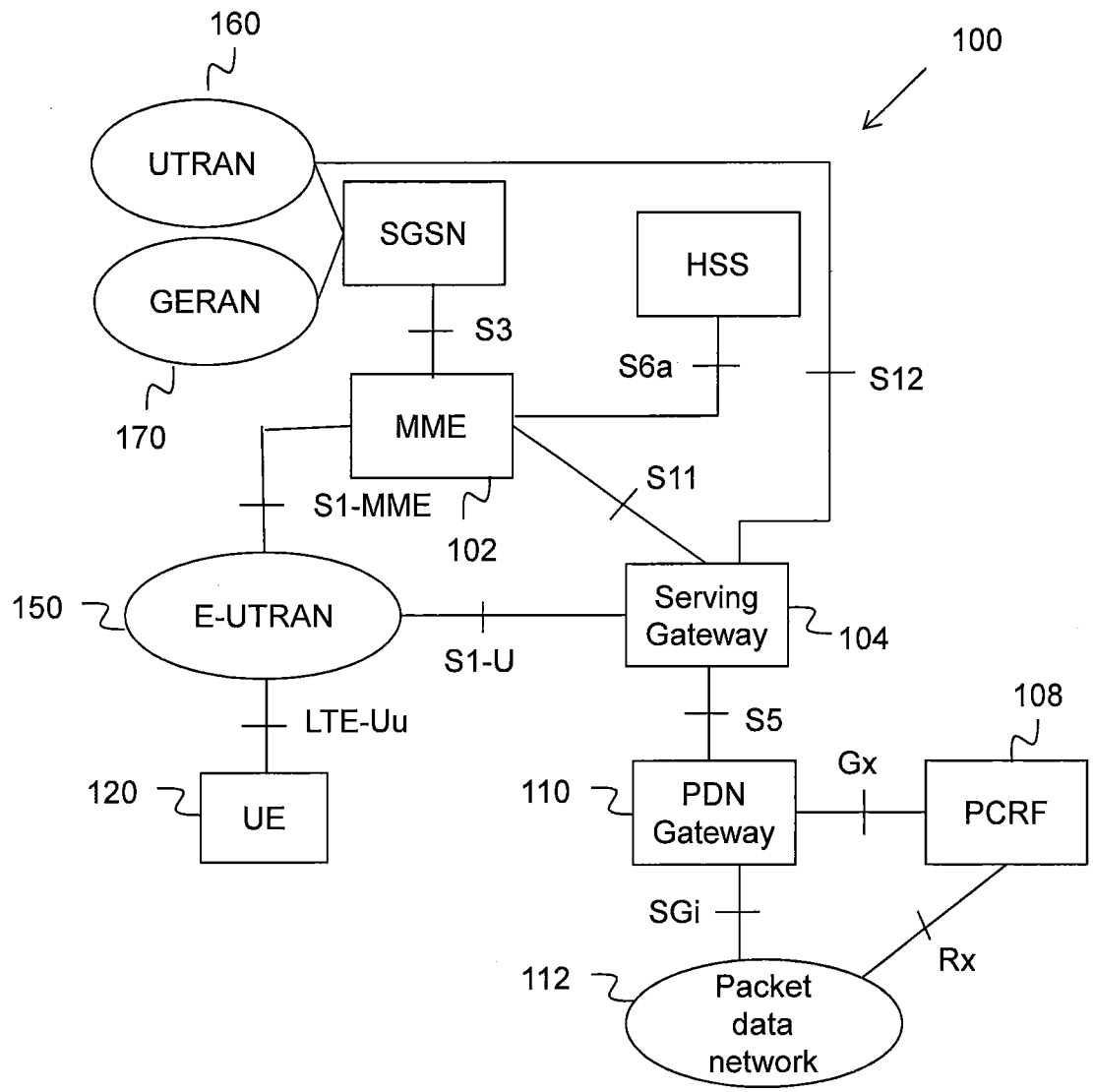
FIG. 1 is a schematic block diagrams illustrating an EPC architecture comprising different 3GPP access networks.
Figure 2:
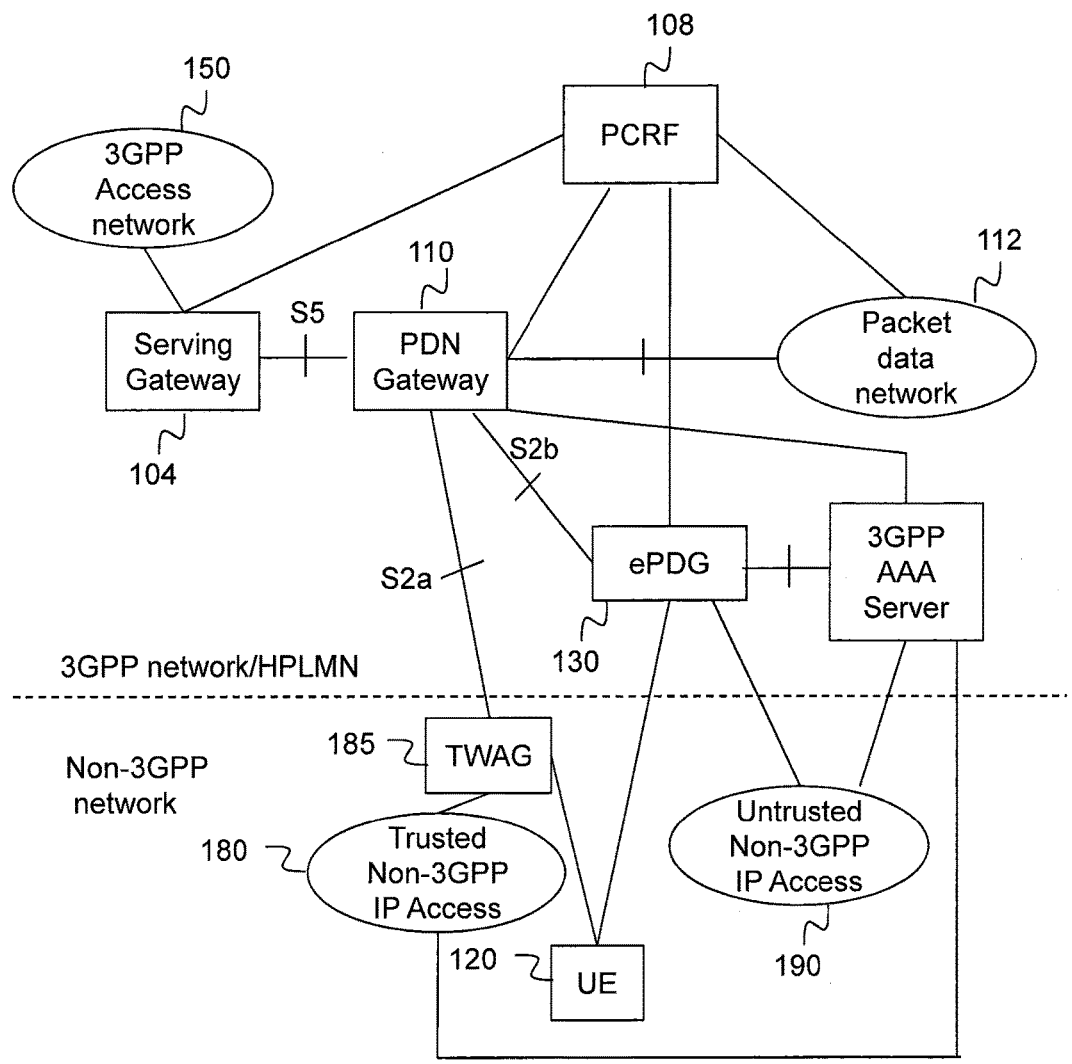
FIG. 2 is a schematic block diagrams illustrating an evolved EPC architecture comprising a 3GPP access network and two non-3GPP access networks.
Figure 3:
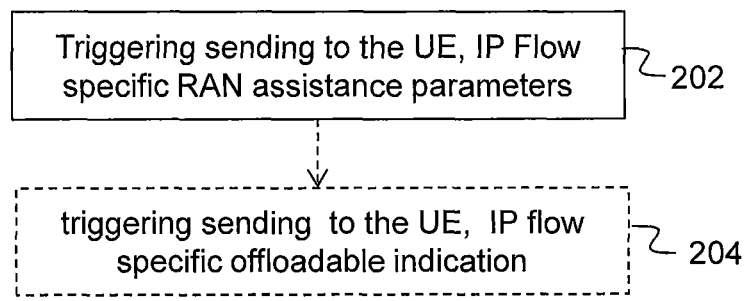
FIG. 3 is a flow chart of a method performed by a 3GPP network node according to embodiments of the invention.

According to an embodiment described in FIG. 3 in conjunction with FIG. 2, a method is provided performed by a 3GPP network node, for controlling IP flow mobility performed in a communication network comprising a 3GPP access network 150 and a non-3GPP access network 180, 190, wherein a UE 120 has an IP flow mobility packet data network, PDN, connection set up towards the communication network. The method comprises triggering sending 202 to the UE, a number of IP flow specific RAN assistance parameter values for controlling the UE to route an IP flow of the IP flow mobility PDN connection either over the 3GPP access network 150 or over the non-3GPP access network 180, 190.

A 3GPP access network is an access network that is built on a technology standardized by 3GPP. Such technologies are e.g. the Global System for Mobile Communications, GSM, including GSM evolved radio access technologies, e.g. General Packet Radio Service, GPRS and Enhanced Data Rates for GSM Evolution, EDGE, evolved third Generation, 3G, and beyond mobile systems such as Long Term Evolution, LTE, based on the evolved 3GPP core networks, and radio access technologies such as UMTS Terrestrial Radio Access, UTRA. A non-3GPP access network is an access network that is built on a technology not standardized by 3GPP. Such a network may be e.g. a Wireless Local Area Network, WLAN or a CDMA2000 network. The 3GPP network node may be a radio network node such as Base Station Controller, BSC, in GSM, an eNodeB in LTE and a Radio Network Controller, RNC, in 3G. Alternatively, the 3GPP network node may be a logical node or a set of logical nodes, which logic is spread out over a plurality of different physical nodes of the 3GPP network, possibly in both the 3GPP radio network and the 3GPP core network. The IP flow mobility PDN connection has connectivity via the 3GPP access network and via the non-3GPP access network.

The number of RAN assistance parameters may be channel quality thresholds for the 3GPP access network and the non-3GPP access network, such as Reference Signal Received Power, RSRP, thresholds at the UE. As for the example with RSRP thresholds, the UE measures channel quality on air interface signals received from the 3GPP access network and from the non-3GPP access network and compares with the thresholds received from the 3GPP network node. Other possible parameters are e.g. 3GPP/non-3GPP channel utilization load thresholds, backhaul available downlink bandwidth thresholds and Beacon Received Signal Strength Indicator, RSSI, thresholds. The thresholds may be used separately or in combination with any of the other. That the RAN assistance parameters are IP flow specific signifies that they are specific per IP flow, i.e. the RAN assistance parameters could be different from one IP flow to another IP flow of the same IP flow mobility connection. In other words, the parameters may have different values for two flows of the same IP flow mobility connection. The 3GPP network node may identify a RAN assistance parameter valid for one IP flow from another RAN assistance parameter valid for another IP flow by checking for example bearer ID, QoS Class Identifier, whether the bearer for the IP flow is a guaranteed bit rate bearer or a non-guaranteed bit rate bearer. Any similar indication may be used that is known both for the 3GPP network node and the UE. By sending IP flow specific RAN assistance parameter values to the UE, the UE can route different IP flows of the same IP flow mobility connection over different access networks.

According to an embodiment, the number of IP flow specific RAN assistance parameter values for controlling the UE is specific threshold values per Quality of Service, QoS, Class identifier, QCI, or specific threshold values per bearer. By having specific threshold values per QoS Class identifier or per bearer, it is possible to send IP flows of the same PDN connection over different access networks when the IP flows have different QoS Class Identifier or when the IP flows are sent on different bearers.

According to another embodiment, at least one value of the number of IP flow specific RAN assistance parameter values are different for guaranteed bit rate bearers and for not guaranteed bit rate bearers. By having different values for the RAN access parameters for guaranteed bit rate, GBR, bearers and not guaranteed bit rate, non-GBR, bearers, it is possible to send IP flows of the same PDN connection over different access networks depending on if they are on GBR bearers or non-GBR bearers.

According to an embodiment, at least one value of the number of IP flow specific RAN assistance parameter values is service type specific. By having different values for the RAN access parameters for different service types it is possible to send IP flows of the same PDN connection over different access networks depending on if the IP flows belong to different types of services, for example one set of RAN access parameter values for mission critical services or public safety services and another set of RAN access parameter values for non-mission critical services or non-public safety services.

According to an embodiment, the method further comprises triggering sending 204 to the UE an IP flow specific offloadable indication indicating whether an IP flow is allowed to be moved from the 3GPP network to the non-3GPP access network. The offloadable indication may have been triggered by a 3GPP core network node such as an MME in a Long Term Evolution, LTE, network, and sent from the 3GPP core network node via the 3GPP radio network. Such a characteristic makes it possible to mark certain IP flows of an IP flow mobility PDN connection as not possible to offload to a non-3GPP connection such as WLAN and other IP flows of the same PDN connection as possible to offload.

Figure 4:
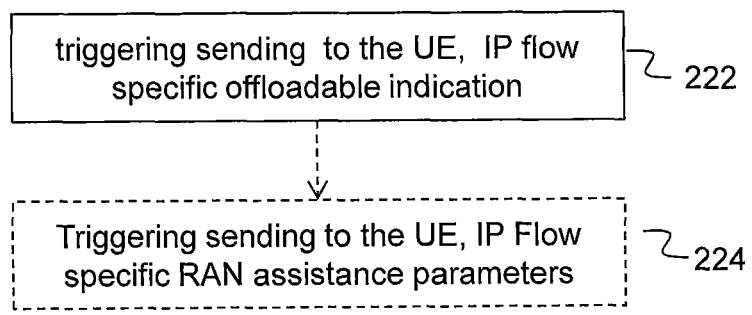
FIG. 4 is a flow chart of a method performed by a 3GPP core network node according to embodiments of the invention.

According to another aspect as shown in FIG. 4, a method is provided performed by a 3GPP core network node is provided, for controlling IP flow mobility performed in a communication network comprising a 3GPP access network and a non-3GPP access network, wherein a UE has an IP flow mobility packet data network, PDN, connection set up towards the communication network. The method comprises triggering 222 sending to the UE, an IP flow specific offloadable indication indicating whether an IP flow is allowed to be moved from the 3GPP network to the non-3GPP access network. The 3GPP core network node may be an MME in an LTE network or a Serving GPRS Support Node in GPRS/3G.

According to an embodiment, the IP flow specific offloadable indication has specific values per Quality of Service, QoS, Class identifier (QCI) or specific values per bearer or specific values for guaranteed bit rate bearers and not guaranteed bit rate bearers or specific values per service type.

According to an embodiment, the method may further comprise triggering sending 224 to the UE, a number of IP flow specific RAN assistance parameter values for controlling the UE to route an IP flow of the IP flow mobility PDN connection either over the 3GPP access network 150 or over the non-3GPP access network 180, 190.

Figure 5:
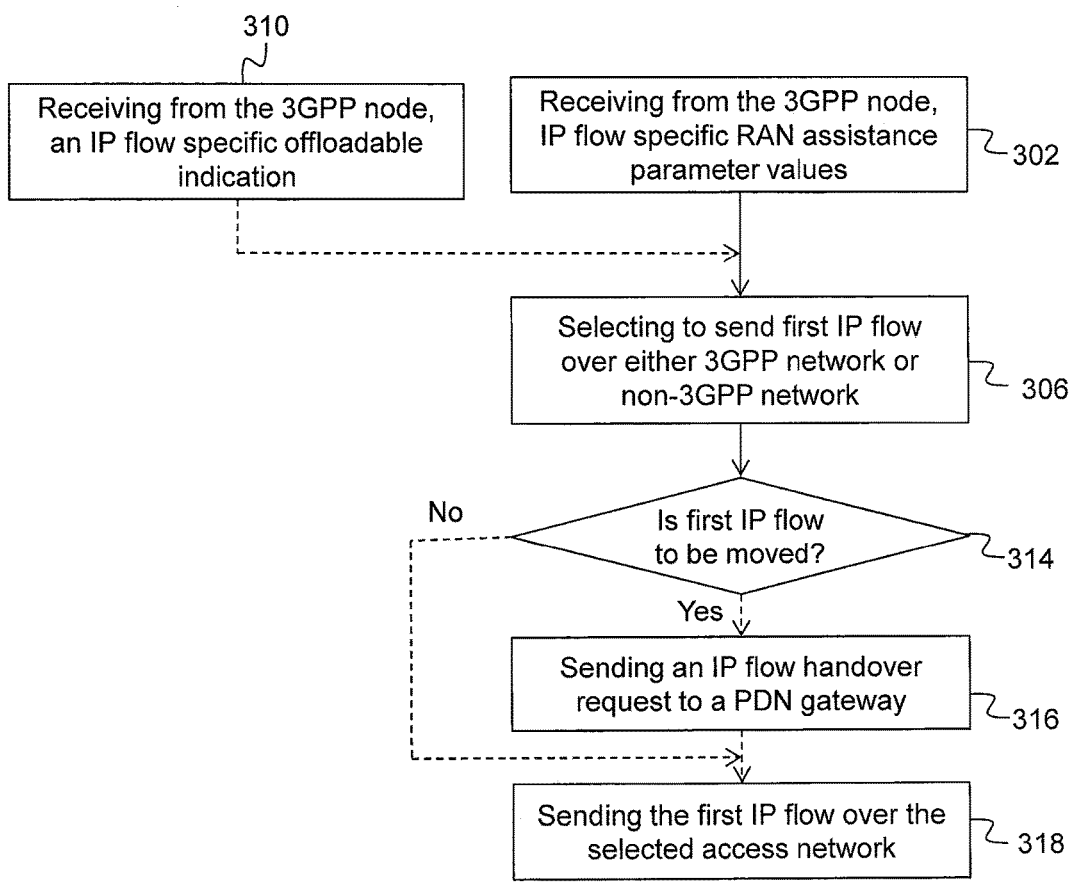
FIG. 5 is a flow chart of a method performed by a UE according to embodiments of the invention.

According to another aspect as shown in FIG. 5, a method is provided performed by a UE 120, for controlling IP flow mobility in a communication network, the UE having an IP flow mobility PDN connection set up towards the communication network, the communication network comprising a 3GPP access network 150 and a non-3GPP access network 180, 190. The method comprises: receiving 302, from a 3GPP network node, a number of IP flow specific RAN assistance parameter values for controlling the UE to route a first IP flow of the IP flow mobility PDN connection either over the 3GPP access network or the non-3GPP access network, and selecting 306 to send the first IP flow of the IP flow mobility PDN connection either over the 3GPP access network or the non-3GPP access network based on the IP flow specific RAN assistance parameter values and on a first IP flow characteristic value.

The IP flow specific RAN assistance parameters may be channel quality thresholds for the 3GPP access network and the non-3GPP access network, such as Reference Signal Received Power, RSRP, thresholds at the UE. As for the example with RSRP thresholds, the IP flow characteristic values may be channel quality values measured by the UE on air interface signals received from the 3GPP access network and from the non-3GPP access network. The UE may compare the measures channel quality values with its respective threshold and select access network based on the comparison. The IP flow characteristics may be any characteristic reflecting the actual communication quality in the respective access network. Other possible IP flow characteristics are e.g. 3GPP/non-3GPP channel utilization load thresholds, backhaul available downlink bandwidth thresholds and Beacon Received Signal Strength Indicator, RSSI, thresholds. The thresholds may be used separately or in combination with any of the other. Since the RAN assistance parameters are IP flow specific it is possible that, depending on the IP flow characteristic values, the first IP flow of the PDN connection is sent over the 3GPP network whereas a second IP flow of the PDN connection having other RAN assistance parameters is sent over the non-3GPP network. Consequently, IP flow mobility can be achieved on a per IP flow basis.

According to an embodiment, the number of IP flow specific RAN assistance parameter values is specific threshold values per Quality of Service, QoS, Class Identifier, QCI, or specific threshold values per bearer.

According to an embodiment, at least one value of the number of IP flow specific RAN assistance parameter values are different for guaranteed bit rate bearers and not guaranteed bit rate bearers. According to another embodiment, at least one value of the number of IP flow specific RAN assistance parameter values is service type specific.

According to another embodiment, the method further comprises receiving 310, from the 3GPP network node, an IP flow specific offloadable indication indicating whether an IP flow over the 3GPP access network is allowed to be moved from the 3GPP access network to the non-3GPP access network. The IP flow specific offloadable indication may have specific values per QCI, or specific values per bearer or specific values for guaranteed bit rate bearers and not guaranteed bit rate bearers or specific values per service type.

According to another embodiment, the selecting to send 306 the first IP flow over the 3GPP access network or the non-3GPP access network is performed by comparing the first IP flow characteristic value with the received number of IP flow specific RAN assistance parameter values.

According to another embodiment, the method further comprises, when the selecting to send the first IP flow over the 3GPP access network or the non-3GPP access network results in that the first IP flow is to be moved from the 3GPP access network to the non-3GPP access network or from the non-3GPP access network to the 3GPP access network, sending 316 to a PDN gateway an IP flow handover request, requesting the PDN gateway to move the first IP flow. The IP flow handover request sent by the PGW to the UE may be an IP flow mobility routing rule update.

According to another embodiment, the method further comprises sending 318 the first IP flow either over the 3GPP access network or over the non-3GPP access network, depending on the selection 306.

According to an embodiment, this document presents a solution where RAN control of IFOM is supported by an extension to the 3GPP release 12 solution for RAN level integration. The solution comprises two main components that may be combined or used separately:

- Triggering IP Flow Mobility in UE using a more granular set of RAN Assistance Parameters from the RAN. The RAN Assistance Parameters may e.g. comprise thresholds per QoS class or thresholds per bearer. This allows the RAN to control, depending on e.g. the QoS or bearer of the traffic, when the UE shall apply IFOM to move traffic from 3GPP access to WLAN access or from WLAN access to 3GPP access.
- Combining the component described in the previous bullet with a more granular "offloadability" indication from the network to the UE. With this solution the network controls, depending on e.g. the QoS or bearer of the traffic, both when traffic is offloaded as well as what traffic is allowed to be offloaded. With the described solution, RAN control of IP flow mobility is supported. The RAN control entity does not need to be aware of the IP layer. Also, no bearer concept over WLAN needs to be introduced.

RAN Control of IP Flow Mobility

According to an embodiment of the current solution, a RAN node provides a single set of thresholds that applies to all UE traffic. The same set may be provided to all UEs, e.g. via broadcast signaling, or to specific UEs, via unicast/dedicated signaling. In both cases the thresholds apply for all the UEs' traffic that is "offloadable". To allow the RAN node to control the 3GPP-WLAN access selection and traffic steering for IFOM, the RAN node can provide more fine-grained RAN Assistance Parameters. There are a number of ways how this can be defined. Below a few examples are described:

Thresholds Per QCI

In this example, the RAN node provides multiple sets of thresholds, where each set is applied for a certain QCI or a number of QCIs. For example, RAN may provide multiple thresholds related to RSRP, e.g. ThreshServingOffloadW-LAN, LowP and/or ThreshServingOffloadWLAN, HighP, where each one is applicable only to a specific QCI, or number of QCIs. The RAN node may e.g. send multiple threshold values to the UE, each threshold value accompanied by one or more QCIs. Alternatively, separate thresholds values are specified so that the UE knows beforehand how to assign a threshold value with one or more QCIs. In the latter case, there is no need for the RAN node to explicitly send QCI values together with the thresholds. In addition to QCI-specific threshold values, the RAN node may also provide "default" threshold values that would apply to all QCIs that do not have QCI-specific thresholds. This may result in a set of thresholds as shown below (example only), where X1,X2, ... Y1,Y2 ... Z1,Z2 ... are suitable values of each threshold:

| QCI(s) | Thresholds |
|---|---|
| 1 | $\text{Thresh}_{ServingOffloadWLAN, LowP} = X1$ |
|   | $\text{Thresh}_{ServingOffloadWLAN, HighP} = X2$ |
|   | $\text{Thresh}_{ServingOffloadWLAN, LowQ} = X3$ |
|   | $\text{Thresh}_{ServingOffloadWLAN, HighQ} = X4$ |
|   | $\text{Thresh}_{ChUtilWLAN, Low} = X5$ |
|   | $\text{Thresh}_{ChUtilWLAN, High} = X6$ |
|   | $\text{Thresh}_{BackhRateDLWLAN, Low} = X7$ |
|   | $\text{Thresh}_{BackhRateDLWLAN, High} = X8$ |
|   | $\text{Thresh}_{BackhRateULWLAN, Low} = X9$ |
|   | $\text{Thresh}_{BackhRateULWLAN, High} = X10$ |
|   | $\text{Thresh}_{BeaconRSSIWLAN, Low} = X11$ |
|   | $\text{Thresh}_{BeaconRSSIWLAN, High} = X12$ |
| 3, 5, 7-9 | $\text{Thresh}_{ServingOffloadWLAN, LowP} = Y1$ |
|   | $\text{Thresh}_{ServingOffloadWLAN, HighP} = Y2$ |
|   | $\text{Thresh}_{ServingOffloadWLAN, LowQ} = Y3$ |
|   | $\text{Thresh}_{ServingOffloadWLAN, HighQ} = Y4$ |
|   | $\text{Thresh}_{ChUtilWLAN, Low} = Y5$ |
|   | $\text{Thresh}_{ChUtilWLAN, High} = Y6$ |
|   | $\text{Thresh}_{BackhRateDLWLAN, Low} = Y7$ |
|   | $\text{Thresh}_{BackhRateDLWLAN, High} = Y8$ |
|   | $\text{Thresh}_{BackhRateULWLAN, Low} = Y9$ |
|   | $\text{Thresh}_{BackhRateULWLAN, High} = Y10$ |
|   | $\text{Thresh}_{BeaconRSSIWLAN, Low} = Y11$ |
|   | $\text{Thresh}_{BeaconRSSIWLAN, High} = Y12$ |
| Default | $\text{Thresh}_{ServingOffloadWLAN, LowP} = Z1$ |
|   | $\text{Thresh}_{ServingOffloadWLAN, HighP} = Z2$ |
|   | $\text{Thresh}_{ServingOffloadWLAN, LowQ} = Z3$ |
|   | $\text{Thresh}_{ServingOffloadWLAN, HighQ} = Z4$ |
|   | $\text{Thresh}_{ChUtilWLAN, Low} = Z5$ |
|   | $\text{Thresh}_{ChUtilWLAN, High} = Z6$ |
|   | $\text{Thresh}_{BackhRateDLWLAN, Low} = Z7$ |
|   | $\text{Thresh}_{BackhRateDLWLAN, High} = Z8$ |
|   | $\text{Thresh}_{BackhRateULWLAN, Low} = Z9$ |
|   | $\text{Thresh}_{BackhRateULWLAN, High} = Z10$ |
|   | $\text{Thresh}_{BeaconRSSIWLAN, Low} = Z11$ |
|   | $\text{Thresh}_{BeaconRSSIWLAN, High} = Z12$ |

Figure 6:
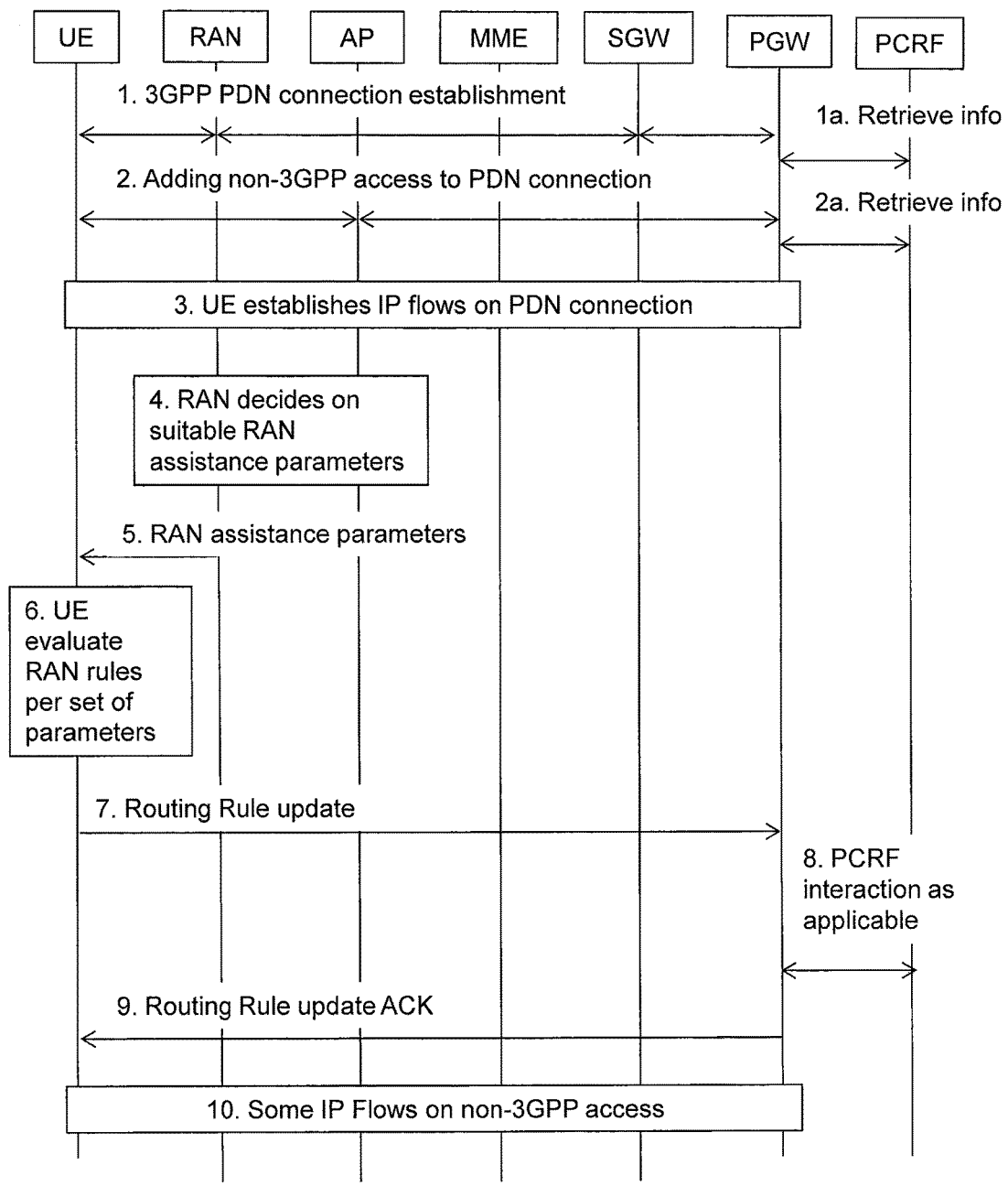
FIG. 6 is a signaling diagrams illustrating signals sent in s system like in FIG. 2 when moving IP flows between 3GPP and non-3GPP networks.

An embodiment of a call flow for providing the RAN Assistance Parameters is shown in FIG. 6. In step 1, a 3GPP PDN connection is established for the UE to the 3GPP network by the UE communicating with the RAN-node that in its case communicates with the SGW and the PGW. For establishing the PDN connection the PGW may retrieve, step 1a, information from the PCRF. Thereafter, a non-3GPP access is added, step 2, to the PDN connection through communication between the UE and a node, e.g. an access point, AP, of the non-3GPP network and between the AP and the PGW. It could also be possible to first setup the non-3GPP access and then the 3GPP access. The PGW may also retrieve information, step 2a, from the PCRF. The UE then establishes IP flows on the PDN connection, initially on the 3GPP access. Further, The RAN node, e.g. eNodeB, decides, step 4, on suitable RAN assistance parameters, i.e. thresholds etc., based on internal algorithms and information available to the RAN node, e.g. information about radio conditions at 3GPP and non-3GPP access network, load, non-3GPP access etc. The RAN node may communicate with the non-3GPP access, e.g. WLAN, to e.g. collect information. Step 4 may be performed independently of the other steps, in other words, step 4 does not have to be performed after step 3 and before step 5. Thresholds for different QCI values and default threshold is generated. The thresholds may be specific for each UE or apply to multiple UEs. RAN decision on suitable RAN assistance parameters may for example be based on collecting network information from both the 3GPP access network, e.g. the RAN, and the non-3GPP access network using network-side interfaces between the 3GPP access network and the non-3GPP access network to exchange different information, for example about load in the different accesses or cells in the different accesses.

Step 5: The RAN node provides the selected RAN assistance parameters, e.g. the thresholds, to the UE. Multiple threshold values for each threshold type may be provided, each one applying to one or more QCIs or being a default threshold value. The threshold types may e.g. be the same type of thresholds as listed in the background. Step 6: The UE evaluates the "RAN rules" for each set of parameters, e.g. threshold values. The RAN rules may e.g. be defined as described in the background but it would be evaluated separately for each set of thresholds. Step 7: If a RAN rule for moving traffic from 3GPP to WLAN is satisfied when applying the thresholds for a certain QCI, or set of QCIs or default, the UE moves all traffic of the same QCI to WLAN. For example, if the UE has one PDN Connection over 3GPP access with two bearers, bearers A and B with QCI=X and QCI=Y, respectively, and the RAN rules for moving traffic to WLAN are fulfilled for bearer B but not for bearer A, then the UE can construct an IFOM Routing Rule with IP filters based on the TFT associated with bearer B and set the access type WLAN. The UE sends that Routing Rule update to the PGW in order to move those IP flows to WLAN. Note that the UE may also need to construct a Routing Rule for the traffic that shall remain on 3GPP access in order to keep it on 3GPP access. Thereafter, in step 8, the PGW may when applicable interact with the PCRF. The PGW sends a routing rule update acknowledgement, step 9, in response to the received routing rule update. Then in step 10, some IP flows, in the example above the IP flow on bearer B, will be routed through the non-3GPP access.

The call flow above shows IP flow mobility to WLAN. If a RAN rule for moving traffic from WLAN to 3GPP is satisfied when applying the thresholds for a certain QCI, or set of QCIs or default, in step 6, the UE moves all traffic of the same QCI to the 3GPP access. Note that in the WLAN access the UE may not be aware of the QCI of the traffic. In this case the UE may apply the default thresholds for all traffic. Also, the RAN node may decide to not send any QCI specific thresholds that apply to the WLAN to the 3GPP network, and only send a default threshold.

Thresholds Per Bearer

A variant of the solution described above is that each threshold is applicable to a specific bearer, or a set of bearers. For example, the RAN node may provide multiple thresholds related to RSRP, e.g. $Thresh_{ServingOffloadWLAN, LowP}$ and/or $Thresh_{ServingOffloadWLAN, HighP}$, where each one is applicable only to a specific Bearer Identity, or number of Bearer IDs. The RAN may send multiple threshold values to the UE, each threshold value accompanied by one or more Bearer IDs. In this solution variant, the thresholds may be sent to the UE using broadcast signaling and/or unicast/dedicated signaling. However, since bearer IDs are assigned when a bearer is established, and since bearer IDs may differ between different UEs, it may be more relevant to use unicast/dedicated signaling in this case.

Other Granularity Levels of RAN Thresholds

In principle, it is also possible for the RAN node to provide RAN Assistance Parameters on a different granularity than per QCI or per bearer. The RAN node could e.g. provide a threshold value, or set of threshold values, for all GBR bearers and another threshold value for all non-GBR bearers. Another alternative may be to provide one set of threshold values for mission critical/public safety service and another set of thresholds for non-mission critical/public safety service.

RAN Control Combined with Indication for What Traffic is Offloadable

As described earlier, the 3GPP network node, e.g. a core network node such as SGSN/MME, provides an indication per PDN Connection on whether the traffic of the PDN Connection is offloadable or not offloadable to WLAN. Such per-PDN-Connection indication is suitable when the UE can only move complete PDN Connections between 3GPP access and WLAN, as in rel-12 solution. Even though the described solution can work with the rel-12 offloadability indication, with IP flow mobility a better solution would be to provide a more fine grained "offloadability" indication. According to an embodiment, to improve the offloadability indication, it is therefore provided per bearer, per QoS class, such as QCI or per IP flow. The offloadability indication may be provided from the PDN gateway, PGW or from the MME/SGSN. The PGW may e.g. decide on the offloadability indication based on policies received from PCRF.

When the more fine grained "offloadability" indication is used, the UE would move, e.g. to WLAN, only the subset of the PDN Connection traffic that is marked as offloadable. For example, if the UE has one PDN Connection over 3GPP access with two bearers, bearer A and B, and only bearer B is offloadable, then the UE can construct a Routing Rule with IP filters based on the TFT associated with bearer B and set the access type to WLAN. The UE sends that Routing Rule to the PGW in order to move those IP flows to WLAN. Note that the UE may also need to construct a Routing Rule for the traffic that shall remain on 3GPP access in order to keep it on 3GPP access.

When the solutions are combined, the RAN node would control on a per QCI or per bearer or per IP flow level when the UE shall move traffic to/from WLAN and the network node would also control on a per QCI or bearer or IP flow level what traffic is allowed to be moved to WLAN.

According to an embodiment, a method is provided in the communication network and in the UE for allowing the 3GPP network node, e.g. the RAN node, to control movement of individual IP flows between the 3GPP access network and the non-3GPP access network WLAN. The method comprises the 3GPP network node, e.g. the RAN node providing instructions, e.g. RAN Assistance Parameters, to the UE, where the instructions apply to a subset of the UE's traffic, e.g. per QCI, per bearer, or per other granularity as exemplified above. The method further comprises the UE applying the RAN Assistance Parameters received from the 3GPP network node, e.g. the RAN node, when evaluating RAN rules for specific traffic types; and uses IFOM to move only the subset of the traffic of each PDN Connection corresponding to the traffic type for which the RAN Rules are fulfilled.

According to another embodiment, the method just described may be combined with a solution where the 3GPP network node, e.g. RAN node, MME, SGSN, PGW, PCRF, also controls on e.g. a per bearer, per QCI, or per other granularity as exemplified above, what traffic is allowed to be offloaded to WLAN and what traffic shall remain on 3GPP access, where the UE and the network node behaves as in the method just described, and in addition, the 3GPP network node, e.g. RAN node, MME, SGSN, PGW, PCRF, provides an "offloadability" indication that apply to one or more QCIs, one or more bearers or one or more IP flows. Further, the UE applies the RAN Assistance Parameters received from the RAN node when evaluating RAN rules for specific traffic types and follows the "offloadability" indication received from the network node and, uses IFOM to move only the subset of the traffic of each PDN Connection that has been marked as being "offloadable" and for which the "RAN rules" are fulfilled.

Figure 7:
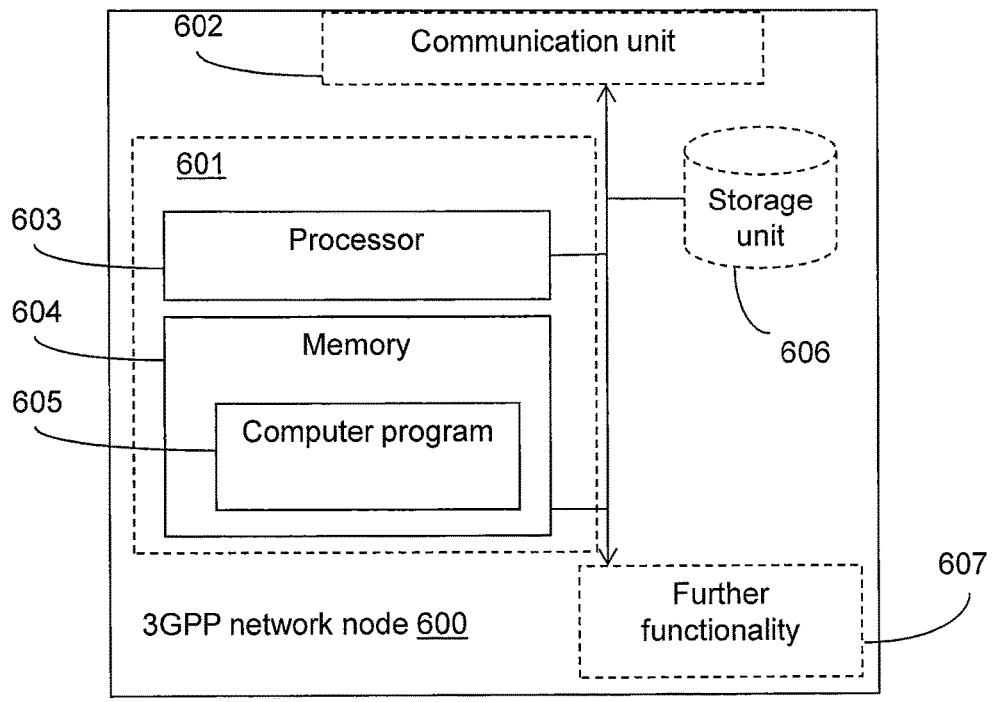
FIGS. 7-8 are schematic block diagrams of 3GPP network nodes according to different embodiments.

According to another aspect described in FIG. 7, a 3GPP network node 600 is provided, operable in a communication network for controlling IP flow mobility in the communication network, the communication network comprising a 3GPP access network 150 and a non-3GPP access network 180, 190, wherein a UE has an IP flow mobility packet data network, PDN, connection set up towards the communication network. The 3GPP network node comprises a processor 603 and a memory 604, said memory containing instructions executable by said processor, whereby the 3GPP network node 600 is operative for triggering sending to the UE, a number of IP flow specific radio access network, RAN, assistance parameter values for controlling the UE to route an IP flow of the IP flow mobility PDN connection either over the 3GPP access network or over the non-3GPP access network.

According to an embodiment, the memory 604 further contains instructions executable by said processor, whereby the 3GPP network node 600 is operative for triggering sending to the UE an IP flow specific offloadable indication indicating whether an IP flow is allowed to be moved from the 3GPP network to the non-3GPP access network.

The 3GPP network node 600 may further comprise a communication unit 602, which may be considered to comprise conventional means for communicating from and/or to the other 3GPP nodes in the network, such as the ones described in connection with FIG. 2. The conventional communication means may include at least one communication port. The 3GPP network node may further comprise one or more storage units 606 and further functionality 607 useful for the 3GPP network node to serve its purpose as 3GPP network node. The instructions executable by said processor may be arranged as a computer program 605 stored in said memory 604. The processor 603 and the memory 604 may be arranged in an arrangement 601. The arrangement 601 may be a micro processor and adequate software and storage therefore, a Programmable Logic Device, PLD, or other electronic component(s)/processing circuit(s) configured to perform the actions, or methods mentioned above.

The computer program 605 may comprise computer readable code means, which when run in the 3GPP network node 600 causes the 3GPP network node to perform the steps described in any of the described embodiments. The computer program may be carried by a computer program product connectable to the processor. The computer program product may be the memory 604. The memory 604 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 604. Alternatively, the computer program may be stored on a server or any other entity connected to the communication network to which the 3GPP network node has access via its communication unit 602. The computer program may then be downloaded from the server into the memory 604.

Figure 8:
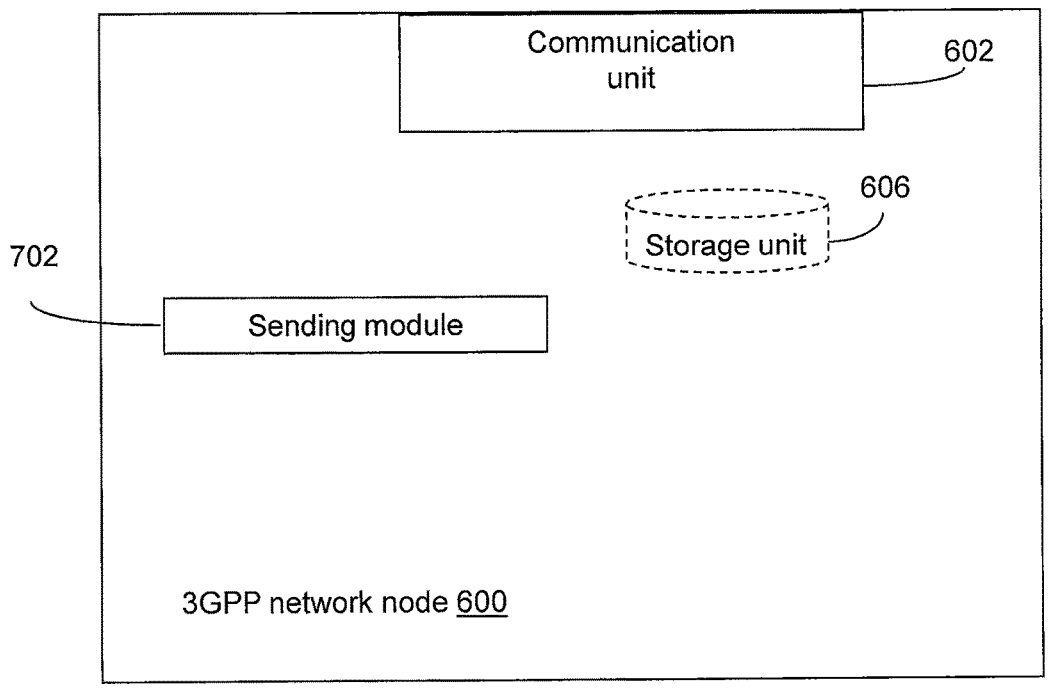

FIG. 8 shows another embodiment of a 3GPP network node 600 operable in a communication network for controlling IP flow mobility in the communication network, the communication network comprising a 3GPP access network 150 and a non-3GPP access network 180, 190, wherein a UE 120 has an IP flow mobility PDN connection set up towards the communication network. The 3GPP network node 600 comprises a sending module 702 operative for triggering sending to the UE, a number of IP flow specific radio access network, RAN, assistance parameter values for controlling the UE to route an IP flow of the IP flow mobility PDN connection either over the 3GPP access network or over the non-3GPP access network.

Figure 9:
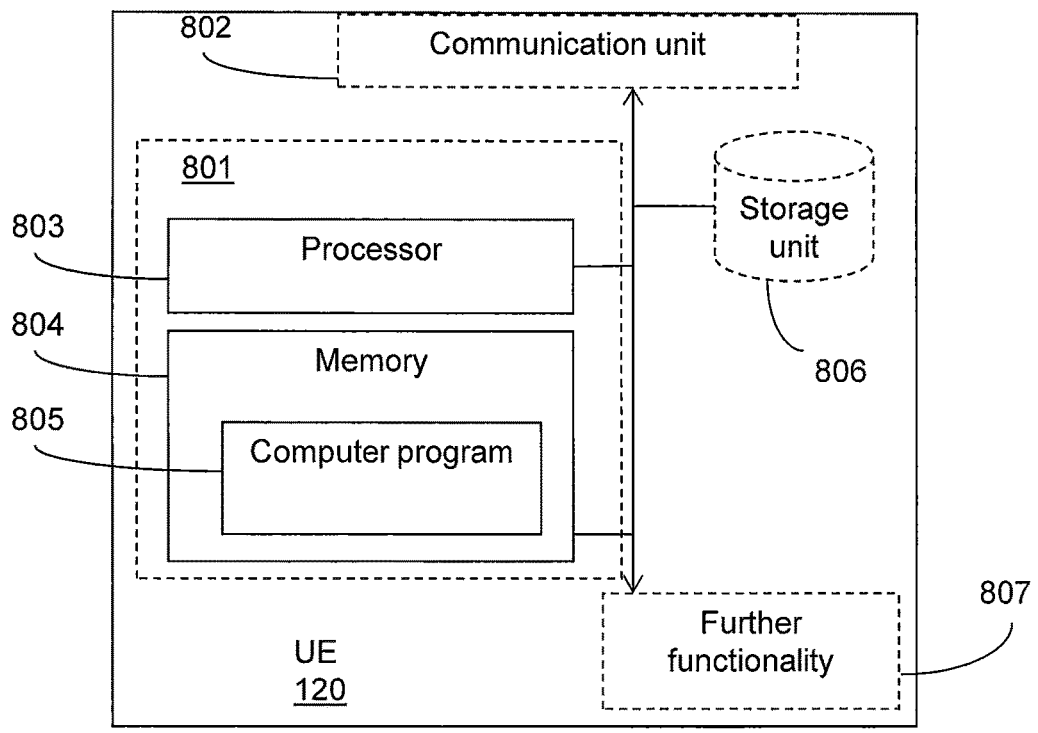
FIGS. 9-10 are schematic block diagrams of UEs according to different embodiments.

According to another aspect illustrated in FIG. 9, a UE 120 is provided operable in a communication network, for controlling IP flow mobility in the communication network, the communication network comprising a 3GPP access network and a non-3GPP access network. The UE 120 has an IP flow mobility PDN connection set up towards the communication network. The UE comprises a processor 803 and a memory 804. The memory contains instructions executable by said processor, whereby the UE 120 is operative for receiving, from a 3GPP network node, a number of IP flow specific RAN assistance parameter values for controlling the UE to route a first IP flow of the IP flow mobility PDN connection either over the 3GPP access network or the non-3GPP access network, and selecting to send the first IP flow of the IP flow mobility PDN connection either over the 3GPP access network or the non-3GPP access network based on the IP flow specific RAN assistance parameter values and on a first IP flow characteristic value.

According to an embodiment, said memory further contains instructions executable by said processor, whereby the UE 120 is operative for receiving, from the 3GPP network node, an IP flow specific offloadable indication indicating whether an IP flow over the 3GPP access network is allowed to be moved from the 3GPP access network to the non-3GPP access network.

According to another embodiment, said memory contains instructions executable by said processor, whereby the UE 120 is operative for sending to a PDN gateway an IP flow handover request, requesting the PDN gateway to move the first IP flow, when the selecting to send the first IP flow over the 3GPP access network or the non-3GPP access network results in that the first IP flow is to be moved from the 3GPP access network to the non-3GPP access network or from the non-3GPP access network to the 3GPP access network.

According to another embodiment, said memory contains instructions executable by said processor, whereby the UE 120 is operative for sending the first IP flow either over the 3GPP access network or over the non-3GPP access network, depending on the selection.

The UE 120 may further comprise a communication unit 802, which may be considered to comprise conventional means for communicating from and/or to the other nodes in the network, such as an access point in a non-3GPP network and an eNodeB in a 3GPP network. The conventional communication means may include at least one transmitter and at least one receiver. The UE may further comprise one or more storage units 806 and further functionality 807 useful for the UE to serve its purpose as UE, such as a battery. The instructions executable by said processor may be arranged as a computer program 805 stored in said memory 804. The processor 803 and the memory 804 may be arranged in an arrangement 801. The arrangement 801 may be a micro processor and adequate software and storage therefore, a Programmable Logic Device, PLD, or other electronic component(s)/processing circuit(s) configured to perform the actions, or methods mentioned above.

The computer program 805 may comprise computer readable code means, which when run in the UE 120 causes the UE to perform the steps described in any of the described embodiments. The computer program may be carried by a computer program product connectable to the processor. The computer program product may be the memory 804. The memory 804 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 804. Alternatively, the computer program may be stored on a server or any other entity connected to the communication network to which the UE has access via its communication unit 802. The computer program may then be downloaded from the server into the memory 804.

Figure 10:
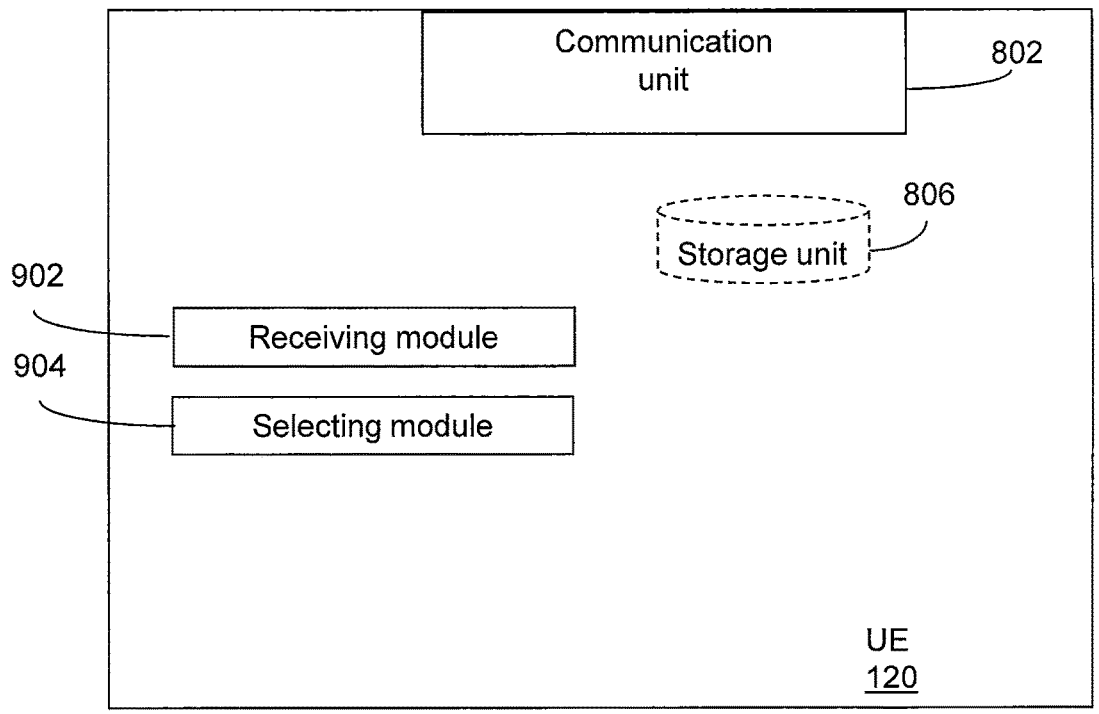

FIG. 10 shows another embodiment of a UE 120 operable in a communication network, for controlling IP flow mobility in the communication network, the communication network comprising a 3GPP access network and a non-3GPP access network. The UE has an IP flow mobility PDN connection set up towards the communication network. The UE 120 comprises a receiving module 902 for receiving, from a 3GPP network node, a number of IP flow specific RAN assistance parameter values for controlling the UE to route a first IP flow of the IP flow mobility PDN connection either over the 3GPP access network or the non-3GPP access network. The UE further has a selecting module 904 for selecting to send the first IP flow of the IP flow mobility PDN connection either over the 3GPP access network or the non-3GPP access network based on the IP flow specific RAN assistance parameter values and on a first IP flow characteristic value.

Figure 11:
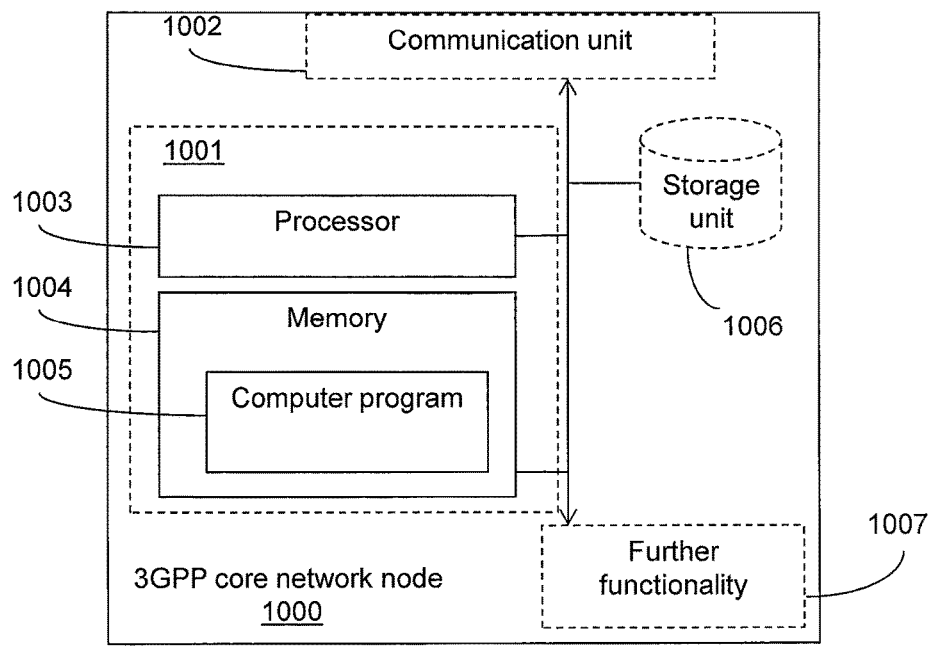
FIGS. 11-12 are schematic block diagrams of 3GPP core network nodes according to different embodiments.

According to another aspect illustrated in FIG. 11, a 3GPP core network node 1000 is provided, operable in a communication network for controlling IP flow mobility in the communication network, the communication network comprising a 3GPP access network and a non-3GPP access network. A UE has an IP flow mobility PDN connection is set up towards the communication network. The 3GPP core network node comprises a processor 1003 and a memory 1004, said memory containing instructions executable by said processor, whereby the 3GPP core network node 1000 is operative for triggering sending to the UE, an IP flow specific offloadable indication indicating whether an IP flow is allowed to be moved from the 3GPP network to the non-3GPP access network.

The 3GPP core network node 1000 may further comprise a communication unit 1002, which may be considered to comprise conventional means for communicating from and/or to the other 3GPP nodes in the network, such as the ones described in connection with FIG. 2. The conventional communication means may include at least one communication port. The 3GPP core network node may further comprise one or more storage units 1006 and further functionality 1007 useful for the 3GPP core network node to serve its purpose as 3GPP core network node. The instructions executable by said processor may be arranged as a computer program 1005 stored in said memory 1004. The processor 1003 and the memory 1004 may be arranged in an arrangement 1001. The arrangement 1001 may be a micro processor and adequate software and storage therefore, a Programmable Logic Device, PLD, or other electronic component(s)/processing circuit(s) configured to perform the actions, or methods mentioned above.

The computer program 1005 may comprise computer readable code means, which when run in the 3GPP core network node 1000 causes the 3GPP core network node to perform the steps described in any of the described embodiments. The computer program may be carried by a computer program product connectable to the processor. The computer program product may be the memory 1004. The memory 1004 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 1004. Alternatively, the computer program may be stored on a server or any other entity connected to the communication network to which the 3GPP core network node has access via its communication unit 1002. The computer program may then be downloaded from the server into the memory 1004.

Figure 12:
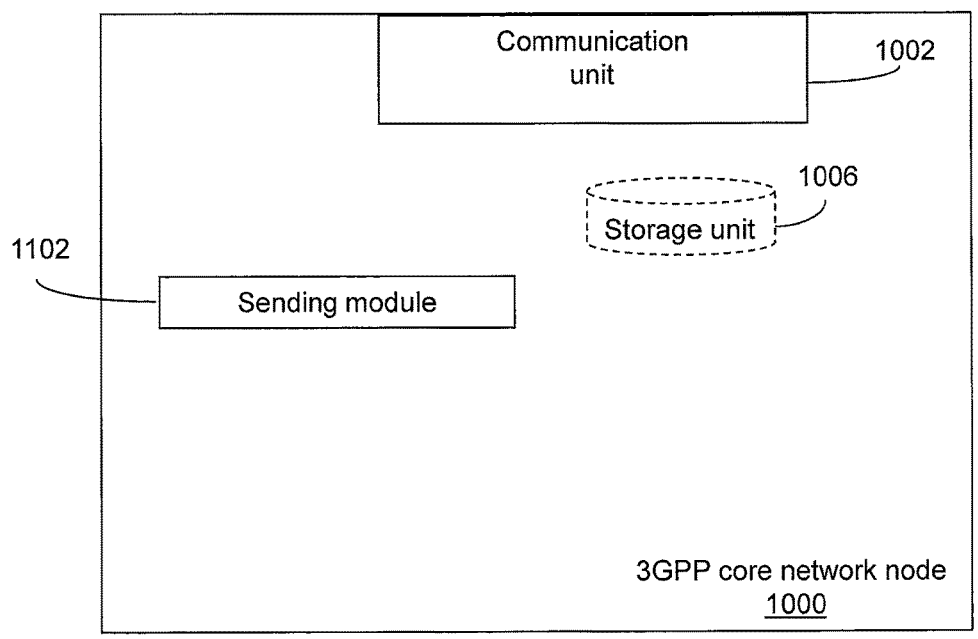

FIG. 12 shows another embodiment of a 3GPP core network node 1000 operable in a communication network, for controlling IP flow mobility in the communication network, the communication network comprising a 3GPP access network and a non-3GPP access network. A UE has an IP flow mobility PDN connection set up towards the communication network. The 3GPP core network node 1000 comprising a sending module 1102 for triggering sending to the UE, an IP flow specific offloadable indication indicating whether an IP flow is allowed to be moved from the 3GPP network to the non-3GPP access network.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a network node, UE or method to address each and every problem sought to be solved by the presently described concept, for it to be encompassed hereby.

The invention claimed is:

1. A method performed by a 3GPP network node for controlling, on a per IP flow basis, IP flow mobility performed in a communication network comprising a 3GPP access network and a non-3GPP access network, wherein a UE has an IP flow mobility packet data network (PDN) connection set up towards the communication network, the method comprising:

triggering sending to the UE, a number of first IP flow specific radio access network (RAN) assistance parameter values for controlling the UE to route, on the per IP flow basis, a first IP flow of the IP flow mobility PDN connection either over the 3GPP access network or over the non-3GPP access network, wherein the first IP flow specific RAN assistance parameter values for controlling the UE comprise threshold values per Quality of Service (QoS) Class identifier (QCI) for the first IP flow or specific threshold values per bearer for the first IP flow, and triggering sending to the UE, a number of second IP flow specific RAN assistance parameter values for controlling the UE to route, on the per IP flow basis, a second IP flow of the IP flow mobility PDN connection either over the 3GPP access network or over the non-3GPP access network, wherein the second IP flow specific RAN assistance parameters are different from the first IP flow specific RAN assistance parameters and comprise threshold values per Quality of Service (QoS) Class identifier (QCI) for the second IP flow or specific threshold values per bearer for the second IP flow, the IP flow mobility PDN connection having a plurality of IP flows, the plurality of IP flows including the first IP flow and the second IP flow, wherein at least one value of the number of first IP flow specific RAN assistance parameter values is service type specific.

2. The method according to claim 1, further comprising:
triggering sending to the UE an IP flow specific offloadable indication indicating whether an IP flow is allowed to be moved from the 3GPP network to the non-3GPP access network.

3. The method according to claim 1,
wherein the first IP flow of the IP flow mobility PDN connection is routed to the 3GPP access network based on the first IP flow specific RAN assistance parameter values, and
wherein the second IP flow of the IP flow mobility PDN connection is routed to the non-3GPP access network based on the second IP flow specific RAN assistance parameter values.

4. The method according to claim 1, wherein the specific values per service type comprise one or more of at least one specific value for mission critical services, at least one specific value for non-mission critical services, at least one specific value for public safety services, or at least one specific value for non-public safety services.

5. A method performed by a 3GPP network node for controlling, on a per IP flow basis, IP flow mobility performed in a communication network comprising a 3GPP access network and a non-3GPP access network, wherein a UE has an IP flow mobility packet data network (PDN) connection set up towards the communication network, the method comprising:
triggering sending to the UE, a number of first IP flow specific radio access network (RAN) assistance parameter values for controlling the UE to route, on the per IP flow basis, a first IP flow of the IP flow mobility PDN connection either over the 3GPP access network or over the non-3GPP access network, wherein the first IP flow specific RAN assistance parameter values for controlling the UE comprise threshold values per Quality of Service (QoS) Class identifier (QCI) for the first IP flow or specific threshold values per bearer for the first IP flow, and triggering sending to the UE, a number of second IP flow specific RAN assistance parameter values for controlling the UE to route, on the per IP flow basis, a second IP flow of the IP flow mobility PDN connection either over the 3GPP access network or over the non-3GPP access network, wherein the second IP flow specific RAN assistance parameter values are different from the first IP flow specific RAN assistance parameter values and comprise threshold values per Quality of Service (QoS) Class identifier (QCI) for the second IP flow or specific threshold values per bearer for the second IP flow, the IP flow mobility PDN connection having a plurality of IP flows, the plurality of IP flows including the first IP flow and the second IP flow, wherein at least one value of the number of IP flow specific RAN assistance parameter values are different for guaranteed bit rate bearers and not guaranteed bit rate bearers.

6. A method for controlling, on a per IP flow basis, IP flow mobility in a communication network, performed by a UE having an IP flow mobility PDN connection set up towards the communication network, the communication network comprising a 3GPP access network and a non-3GPP access network, the method comprising:
receiving, from a 3GPP network node, a number of first IP flow specific RAN assistance parameter values for controlling the UE to route, on the per IP flow basis, a first IP flow of the IP flow mobility PDN connection either over the 3GPP access network or the non-3GPP access network, wherein the first IP flow specific RAN assistance parameter values for controlling the UE comprise threshold values per Quality of Service (QoS) Class identifier (QCI) for the first IP flow or specific threshold values per bearer for the first IP flow, receiving, from the 3GPP network node, a number of second IP flow specific RAN assistance parameter values for controlling the UE to route, on the per IP flow basis, a second IP flow of the IP flow mobility PDN connection either over the 3GPP access network or over the non-3GPP access network, wherein the second IP flow specific RAN assistance parameter values are different from the first IP flow specific RAN assistance parameter values and comprise threshold values per Quality of Service (QoS) Class identifier (QCI) for the second IP flow or specific threshold values per bearer for the second IP flow, the IP flow mobility PDN connection having a plurality of IP flows, the plurality of IP flows including the first IP flow and the second IP flow, and selecting to send the first IP flow of the IP flow mobility PDN connection either over the 3GPP access network or the non-3GPP access network based on the IP flow specific RAN assistance parameter values and on a first IP flow characteristic value, wherein at least one value of the number of first IP flow specific RAN assistance parameter values is service type specific.

7. The method according to claim 6, wherein the number of IP flow specific RAN assistance parameter values are specific threshold values per Quality of Service (QoS) Class Identifier (QCI) or specific threshold values per bearer.

8. The method according to claim 6, further comprising:
receiving, from the 3GPP network node, an IP flow specific offloadable indication indicating whether an IP flow over the 3GPP access network is allowed to be moved from the 3GPP access network to the non-3GPP access network.

9. The method according to claim 8, wherein the IP flow specific offloadable indication has specific values per Quality of Service (QoS) Class identifier (QCI) or specific values per bearer or specific values for guaranteed bit rate bearers and not guaranteed bit rate bearers.

10. The method according to claim 6, wherein the selecting to send the first IP flow over the 3GPP access network or the non-3GPP access network is performed by comparing the first IP flow characteristic value with the received number of IP flow specific RAN assistance parameter values.

11. The method according to claim 6, further comprising:
when the selecting to send the first IP flow over the 3GPP access network or the non-3GPP access network results in that the first IP flow is to be moved from the 3GPP access network to the non-3GPP access network or from the non-3GPP access network to the 3GPP access network, sending to a PDN gateway an IP flow handover request, requesting the PDN gateway to move the first IP flow.

12. The method according to claim 6, further comprising:
sending the first IP flow either over the 3GPP access network or over the non-3GPP access network, depending on the selection.

13. The method according to claim 6,
wherein the first IP flow of the IP flow mobility PDN connection is selected to send to the 3GPP access network based on the first IP flow specific RAN assistance parameter values, and
wherein the second IP flow of the IP flow mobility PDN connection is selected to send to the non-3GPP access network based on the second IP flow specific RAN assistance parameter values.

14. A method for controlling, on a per IP flow basis, IP flow mobility in a communication network, performed by a UE having an IP flow mobility PDN connection set up towards the communication network, the communication network comprising a 3GPP access network and a non-3GPP access network, the method comprising:
receiving, from a 3GPP network node, a number of first IP flow specific RAN assistance parameter values for controlling the UE to route, on the per IP flow basis, a first IP flow of the IP flow mobility PDN connection either over the 3GPP access network or the non-3GPP access network, wherein the first IP flow specific RAN assistance parameter values for controlling the UE comprise threshold values per Quality of Service (QoS) Class identifier (QCI) for the first IP flow or specific threshold values per bearer for the first IP flow,
receiving, from the 3GPP network node, a number of second IP flow specific RAN assistance parameter values for controlling the UE to route, on the per IP flow basis, a second IP flow of the IP flow mobility PDN connection either over the 3GPP access network or over the non-3GPP access network, wherein the second IP flow specific RAN assistance parameter values are different from the first IP flow specific RAN assistance parameter values and comprise threshold values per Quality of Service (QoS) Class identifier (QCI) for the second IP flow or specific threshold values per bearer for the second IP flow, the IP flow mobility PDN connection having a plurality of IP flows, the plurality of IP flows including the first IP flow and the second IP flow, and
selecting to send the first IP flow of the IP flow mobility PDN connection either over the 3GPP access network or the non-3GPP access network based on the IP flow specific RAN assistance parameter values and on a first IP flow characteristic value,
wherein at least one value of the number of IP flow specific RAN assistance parameter values are different for guaranteed bit rate bearers and not guaranteed bit rate bearers.

15. A 3GPP network node operable in a communication network for controlling, on a per IP flow basis, IP flow mobility in the communication network, the communication network comprising a 3GPP access network and a non-3GPP access network, wherein a UE has an IP flow mobility packet data network (PDN) connection set up towards the communication network, the 3GPP network node comprising a processor and a memory, said memory containing instructions executable by said processor, whereby the 3GPP network node is configured to:
trigger sending to the UE, a number of first IP flow specific radio access network (RAN) assistance parameter values for controlling the UE to route, on the per IP flow basis, a first IP flow of the IP flow mobility PDN connection either over the 3GPP access network or over the non-3GPP access network, wherein the first IP flow specific RAN assistance parameter values for controlling the UE comprise threshold values per Quality of Service (QoS) Class identifier (QCI) for the first IP flow or specific threshold values per bearer for the first IP flow
triggering sending to the UE, a number of second IP flow specific RAN assistance parameter values for controlling the UE to route, on the per IP flow basis, a second IP flow of the IP flow mobility PDN connection either over the 3GPP access network or over the non-3GPP access network, wherein the second IP flow specific RAN assistance parameter values are different from the first IP flow specific RAN assistance parameter values and comprise threshold values per Quality of Service (QoS) Class identifier (QCI) for the second IP flow or specific threshold values per bearer for the second IP flow, the IP flow mobility PDN connection having a plurality of IP flows, the plurality of IP flows including the first IP flow and the second IP flow,
wherein at least one value of the number of IP flow specific RAN assistance parameter values is service type specific.

16. The 3GPP network node according to claim 15, wherein the memory further contains instructions executable by said processor, whereby the 3GPP network node is operative for triggering sending to the UE an IP flow specific offloadable indication indicating whether an IP flow is allowed to be moved from the 3GPP network to the non-3GPP access network.

17. A UE operable in a communication network, for controlling, on a per IP flow basis, IP flow mobility in the communication network, the communication network comprising a 3GPP access network and a non-3GPP access network, the UE having an IP flow mobility PDN connection set up towards the communication network, the UE comprising a processor and a memory, said memory containing instructions executable by said processor, whereby the UE is configured to:
receive, from a 3GPP network node, a number of first IP flow specific RAN assistance parameter values to control the UE to route on the per IP flow basis, a first IP flow of the IP flow mobility PDN connection either over the 3GPP access network or the non-3GPP access network, wherein the first IP flow specific RAN assistance parameter values for controlling the UE comprise threshold values per Quality of Service (QoS) Class identifier (QCI) for the first IP flow or specific threshold values per bearer for the first IP flow, receive, from the 3GPP network node, a number of second IP flow specific RAN assistance parameter values to control the UE to route, on the per IP flow basis, a second IP flow of the IP flow mobility PDN connection either over the 3GPP access network or over the non-3GPP access network, wherein the second IP flow specific RAN assistance parameter values are different from the first IP flow specific RAN assistance parameter values and comprise threshold values per Quality of Service (QoS) Class identifier (QCI) for the second IP flow or specific threshold values per bearer for the second IP flow, the IP flow mobility PDN connection having a plurality of IP flows, the plurality of IP flows including the first IP flow and the second IP flow, and select to send the first IP flow of the IP flow mobility PDN connection either over the 3GPP access network or the non-3GPP access network based on the IP flow specific RAN assistance parameter values and on a first IP flow characteristic value, wherein at least one value of the number of IP flow specific RAN assistance parameter values is service type specific.

18. The UE according to claim 17, wherein said memory contains instructions executable by said processor, whereby the UE is configured to receive, from the 3GPP network node, an IP flow specific offloadable indication indicating whether an IP flow over the 3GPP access network is allowed to be moved from the 3GPP access network to the non-3GPP access network.

19. The UE according to claim 17, wherein said memory contains instructions executable by said processor, whereby the UE is configured to send to a PDN gateway an IP flow handover request, requesting the PDN gateway to move the first IP flow, when the selecting to send the first IP flow over the 3GPP access network or the non-3GPP access network results in that the first IP flow is to be moved from the 3GPP access network to the non-3GPP access network or from the non-3GPP access network to the 3GPP access network.

20. The UE according to claim 17, wherein said memory contains instructions executable by said processor, whereby the UE is configured to send the first IP flow either over the 3GPP access network or over the non-3GPP access network, depending on the selection.

* * * * *